US008739444B2

(12) United States Patent
Poole

(10) Patent No.: US 8,739,444 B2
(45) Date of Patent: Jun. 3, 2014

(54) COLOR CODING SYSTEM FOR SIZING FASTENER PARTS, TOOLS AND STORAGE BINS

(76) Inventor: Ronnie Poole, Texarkana, AR (US)

( * ) Notice: Subject to any disclaimer, the term of this patent is extended or adjusted under 35 U.S.C. 154(b) by 1 day.

(21) Appl. No.: 13/385,807

(22) Filed: Mar. 7, 2012

(65) Prior Publication Data
US 2012/0233893 A1 Sep. 20, 2012

Related U.S. Application Data

(60) Provisional application No. 61/464,671, filed on Mar. 8, 2011.

(51) Int. Cl.
G09F 3/20 (2006.01)

(52) U.S. Cl.
USPC ................................. 40/657; 283/81; 40/638

(58) Field of Classification Search
USPC ............ 232/1 D, 24; 40/377, 611.01, 642.02, 40/661, 564–576, 617, 653, 913–915; 7/164; 211/126.7
See application file for complete search history.

(56) References Cited

U.S. PATENT DOCUMENTS

| | | | | | |
|---|---|---|---|---|---|
| 1,212,279 | A | * | 1/1917 | Stone | 33/1 A |
| 2,808,671 | A | * | 10/1957 | Smith et al. | 40/569 |
| 3,858,325 | A | * | 1/1975 | Goerler | 33/199 R |
| 3,937,493 | A | * | 2/1976 | Fasbender | 283/41 |
| 4,204,639 | A | * | 5/1980 | Barber et al. | 235/488 |
| 4,559,730 | A | * | 12/1985 | Burrell | 40/324 |
| 4,715,621 | A | * | 12/1987 | Colavito et al. | 283/36 |
| 4,841,653 | A | * | 6/1989 | Negley | 40/625 |
| 4,844,509 | A | * | 7/1989 | Kasprzak et al. | 283/81 |
| 5,150,788 | A | * | 9/1992 | Weissman | 206/369 |
| 5,151,687 | A | * | 9/1992 | Younger | 715/810 |
| 5,197,764 | A | * | 3/1993 | Hicinbothem et al. | 283/81 |
| 5,395,137 | A | * | 3/1995 | Kim | 283/81 |
| 5,406,716 | A | * | 4/1995 | Rubinstein | 33/760 |
| 5,479,734 | A | * | 1/1996 | Rouget et al. | 40/373 |
| D366,843 | S | * | 2/1996 | Rosenstein | D10/64 |
| 5,511,662 | A | * | 4/1996 | Amoroso et al. | 206/373 |
| 5,683,114 | A | * | 11/1997 | Lauer et al. | 283/74 |
| 5,693,911 | A | * | 12/1997 | Sydow | 174/66 |
| D421,575 | S | * | 3/2000 | Palm | D10/64 |
| 6,132,416 | A | * | 10/2000 | Broselow | 604/506 |
| 6,497,329 | B1 | * | 12/2002 | Johnson et al. | 211/128.1 |
| D471,826 | S | * | 3/2003 | Rosenstein | D10/64 |
| D637,500 | S | * | 5/2011 | Corbin | D10/64 |
| 8,165,929 | B2 | * | 4/2012 | Chudy et al. | 705/28 |
| 2004/0074119 | A1 | * | 4/2004 | Kim | 40/312 |
| 2005/0081416 | A1 | * | 4/2005 | Morris | 40/649 |
| 2006/0207144 | A1 | * | 9/2006 | Milliorn | 40/637 |
| 2007/0124974 | A1 | * | 6/2007 | Lanier | 40/658 |
| 2009/0020447 | A1 | * | 1/2009 | Potterfield et al. | 206/373 |
| 2009/0115299 | A1 | * | 5/2009 | Ricereto | 312/330.1 |
| 2009/0178989 | A1 | * | 7/2009 | Accuardi | 211/126.7 |
| 2010/0206765 | A1 | * | 8/2010 | Fonte | 206/534 |
| 2010/0218407 | A1 | * | 9/2010 | Kahng | 40/584 |
| 2011/0072700 | A1 | * | 3/2011 | Theresa et al. | 40/638 |
| 2011/0314714 | A1 | * | 12/2011 | Baxendale et al. | 40/606.03 |
| 2012/0233893 | A1 | * | 9/2012 | Poole | 40/299.01 |

* cited by examiner

Primary Examiner — Shin Kim
(74) Attorney, Agent, or Firm — Boyd D. Cox

(57) ABSTRACT

The color coding system is for use with a storage bin for fastener parts and tools that assists in identifying and matching the cooperating sizes of fastener parts and tools by using color code markings on the various sizes for tools and fastener parts. The color coding system can readily communicate visually to a user the size of a selected fastener part, the sizes of cooperating fastener parts and the sizes of the cooperating tools for each of the selected fastener parts.

10 Claims, 8 Drawing Sheets

COLOR CODING SYSTEM FOR SIZING FASTENER PARTS, TOOLS AND STORAGE BINS

Priority for this application is claimed from U.S. Provisional Application No. 61/464,671 entitled "Color Coding System For Sizing Fastener Parts, Tools And Storage Bins" filed on Mar. 8, 2011

BACKGROUND

The present invention is directed to a color coding system for readily identifying and matching fastener parts and tools according to size. The storage bins have compartments that are labeled by color to readily identify and match the size of the fastener parts to the compartments in which the parts are to be held and to match fastener parts to tools. The present invention further includes a portable sizing gauge that uses color coding to quickly identify the sizes of fastener parts and matching tools when working in the field.

Typically, fastener parts which include bolts, nuts and various types of washers are distinguished by fractional diameter sizes such as ¼-inch, 5/16-inch, ⅜-inch, 7/16-inch or in metric sizes such as 4 mm, 6 mm, 7 mm, etc. These parts are often sold and stored separately, requiring that the user match the fastener parts together when assembling the fastener. By trial and error, a user can eventually find the correct fit for the fastener parts such as locating the proper nut or washer for a particular size of bolt. However, he or she must try various sizes of parts until the proper fit is found. This method of trial and error can be both frustrating and time consuming.

Even when the containers for the fastener parts are marked with the sizes of the parts held therein, such markings can be difficult to read, thereby making it cumbersome to match together same sized fastener parts.

Therefore, there is a need for a coding system that enables a user to readily locate the proper size of any given fastener part in order to quickly match the fitted parts.

In the field, fastener parts are generally stored separately according to size and shape. When assembling a fastener, it is necessary to match the separate parts according to size. Consequently, there is a need for quickly identifying the sizes of the fastener parts in order to complete a job in a shorter amount of time.

In addition, tools are often required to assemble the fastener parts. When assembling the fastener parts, readily locating the proper size of tool for engaging the selected fastener parts is desirable.

A user needs to be able to quickly identify and match the sizes of the various fastener parts that fit together to form the fastener. Therefore, there is a need for a system of readily identifying and maintaining fastener parts and tools according to their sizes. On the job site or in a store, fastener parts are often held in various types of storage bins, so there is a need for an identification system that can be retrofitted to different types of existing storage bins that hold fastener parts.

There is also the need for an identification system to readily identify the sizes of tools and fastener parts in order to quickly match cooperating fastener parts to each other and select the correctly sized wrench or socket. Since fastener parts are often assembled in the field, a system that is portable for easy transport and that can be used on the job site is desirable.

When working in the field, low lighting situations can be common, making it difficult for a worker to find the correctly fitting fastener parts and to find the proper tool that fits the selected fastener part. In addition, some workers may not be proficient enough in a given language to read the sizing standards typically used to label fastener parts and tools. Therefore, there is a need for a system that can not only communicate nonverbally the sizes of fastener parts and tools, but also can operate in low light situations in order to easily match the cooperating fastener parts and tools together.

For decades, nuts, bolts and other fastener parts have been stored in pigeonhole type storage bins in factories, auto parts stores, machine shops, hardware stores and workshops throughout the world. When a mechanic has a bolt and needs a flat washer and nut to fit with the bolt, he or she typically uses trial and error methods to find a fit. With trial and error one merely guesses the fit and continues to try fitting the different fastener parts together until the proper sized part is found.

Most types of cooperating fasteners are fitted together using a tool such as a wrench or socket. Wrenches and sockets have standard sizes designed to fit standard sized fastener parts. The differently sized parts each have a tool sized to fit. Typically, the proper fitting tool for a fastener part is found by trial and error. There is a need for an identification system that can readily match the proper size of tool with the cooperating fastener part size in order to reduce frustration and increase work efficiency.

Most hardware stores have storage bins in which the fastener parts are stored according to size, shape and various other factors such as price or function. In self service stores or in the field, one must match the sizes of multiple cooperating fastener parts. Again, trial and error are typically used to match together all of the cooperating parts of a fastener. This can be frustrating, time consuming and exceedingly difficult in low lighting situations and/or inclement weather.

Some retailers have self service bins for displaying fastener parts, whereby each bin holds fastener parts that are the same size. Each bin is typically labeled to indicate the size of the parts held therein. These labels typically display a picture of the bolt, nut or washer, a barcode and a number to indicate the size. A user can eventually locate the desired fastener parts using the label on the bin as a guide, but locating the proper tool can pose another challenge. He or she must know the particular size of the cooperating tool. When the size of the tool is unknown, the user must once again resort to trial and error to find the proper tool that fits the fastener.

It can be cumbersome to have to match the correct size of fastener parts to each other by using trial and error methods. By quickly finding the correctly sized fastener part, the time required for completing a job can be reduced. In retail stores, quick location of a product such as fastener parts can lead to satisfied customers and increased sales.

On the job, choosing the properly sized tool to fit a fastener can also be time consuming if the user has to make guesses to determine which tool will fit the given fastener part. In situations where the workman cannot read the label description, it can be difficult to quickly match the same sized fastener parts and tools. These prior art labels, having only a written description of the fastener part or tool, fail to help the user to quickly identify the properly sized item that is needed.

In the prior art, storage bins are usually labeled with the sizes being indicated for various fastener parts, including washers, nuts and bolts. As an example, bolts are generally labeled with the diameter and the length of the bolt. The label might also include a picture of the bolt, nut or washer, as well as a bar code for that fastener part size. Alternatively, bolt gauges for measuring length comprising a ruler and a plurality of apertures for measuring diameter are used in the prior art to identify the size of bolts.

However, these storage bins and bolt gauges do not have color code markings to indicate sizes when matching tools and fastener parts, making it difficult to accomplish such a task.

In addition, searching for a tool, such as a wrench, to fit a bolt can require a lot of guess work. Trial and error is generally the method used for finding the correctly sized wrench to fit a bolt or nut.

Searching by trial and error for the properly fitted tool and fastener part can be time consuming and frustrating for the mechanic, thereby increasing operating costs in a repair shop. In a retail business, the resultant frustration to the customer can result in loss of sales. It can also increase the need for assistance to the customer by sales persons, thereby requiring more employees in the store.

With a color coding system, the storage bin holding the fastener parts and the tools have highly visible color code markings to identify the sizes. Consequently, a mechanic or workman can readily identify the cooperating fastener parts for which he or she is searching, thereby saving time and frustration. In addition to finding the properly sized fastener parts, the coding system of the present invention also facilitates locating the properly sized tool to use with a given fastener. The color coded system and sizing gauge can be used in various venues, including retail businesses, warehouses, storage facilities and job sites.

With color code markings on the compartments of the storage bin indicating a particular size of fastener part and the tool sized for the part, one can easily locate the desired cooperating parts and tools, thereby saving time for mechanics, construction personnel, carpenters and other workers.

The color coding system readily communicates the size of the fastener parts held in the compartment of the storage bin and the size of the tool to use with the respective fastener parts. This eliminates the need for haphazard searching for cooperating sizes of fastener parts and tools, thereby making it quicker and easier for mechanics, repairmen and other users to identify the proper sizes of fastener parts, as well as the properly sized tool for fitting a selected fastener.

The color coding system of the present invention nonverbally communicates to a user the sizes of fastener parts, the sizes of tools and which size of each matches the other. The color code markings of the system are preferably highly visible to enhance the system's use in low light conditions.

SUMMARY

The present invention is a color coding system for readily identifying the sizes of fastener parts, for locating the proper size tool to fit a selected fastener part, and for identifying a storage bin according to the size of parts stored therein.

The system includes color code markings which are disposed on the front surface of the storage bin that holds the fastener parts and on an outer surface of the tools. A unique color or pattern comprised by the color code markings corresponds to each of the designated standard and metric sizes of the fastener parts and tools.

The storage bin comprises a plurality of compartments for holding fastener parts according to size. Each compartment includes a label having a description of the fastener part stored therein. The label includes the size of the fastener part (bolt, nut, washer, etc.), a picture of the fastener part, an identifying bar code, the wrench/socket size that fits the fastener part and at least two color code markings one of which designates the respective size of cooperating fastener parts and the other which designates the size of the cooperating tool.

Consequently, the present invention is a color coding system for a storage bin, fasteners and tools that assists in identifying and matching the cooperating sizes of fastener parts and tools by using color code markings on the various sizes for tools and fastener parts. The color coding system can readily communicate to a user the size of a selected fastener part, the sizes of cooperating fastener parts and the sizes of the cooperating tools for each of the selected fastener parts.

It is an object of the present invention to provide a means allowing users to quickly identify and match the sizes of fastener parts, including nuts, bolts and washers, to each other.

It is a further object of the present invention to assist users in quickly identifying the tool that cooperates with a particular fastener.

It is a further object of the present invention to provide a means for easily identifying and matching the sizes of fastener parts and tools.

It is a further object of the present invention to provide a quick and easy means for identifying the size of a fastener part.

It is a further object of the present invention to provide a quick and easy means for identifying the size of a tool.

It is a further object of the present invention to provide a quick and easy means for matching the proper tool to be used with a particular fastener.

It is a further object of the present invention to provide a color coding system for readily matching a fastener to the properly sized tool.

It is a further object of the present invention to provide a color coding system that can be retrofitted to existing storage/display bins.

It is a further object of the present invention to provide a color coding system with color code markings that readily enables matching of the storage bin and the size of the fastener part to be held therein.

It is a further object of the present invention to provide a color coding system that allows a user to readily identify the storage bin for a particular sized fastener part.

It is a further object of the present invention to provide a system comprising color code markings to indicate size of sockets, wrenches and storage bins for holding fastener parts.

It is a further object of the present invention to provide a means for readily identifying sizes of fastener parts and tools in low light conditions.

It is a further object of the present invention to provide a nonverbal means for readily identifying matching sizes of fastener parts and tools.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
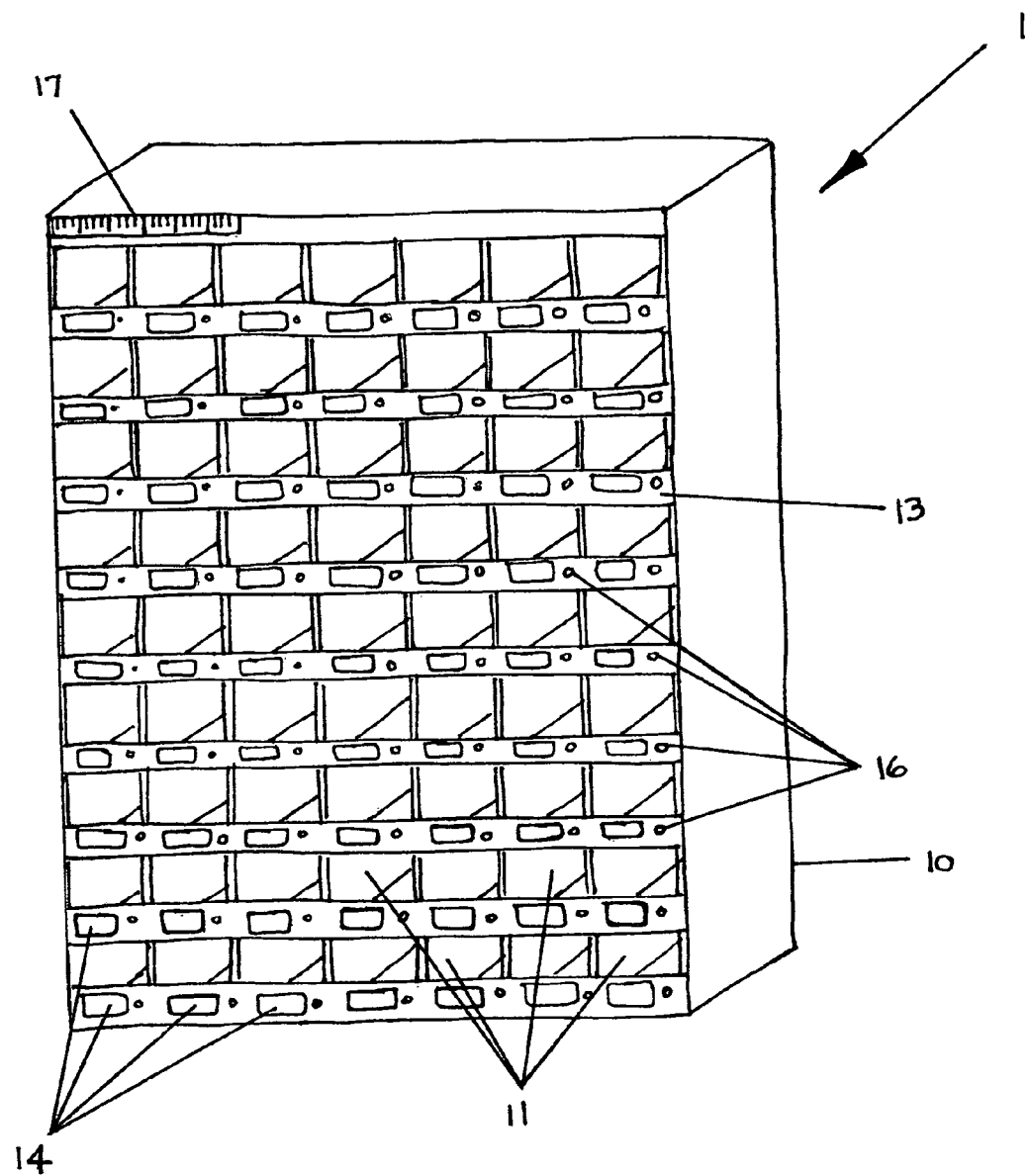
FIG. 1 is a perspective view of a first embodiment of a storage bin comprised by the color coding system of the present invention.

The color coding system (1) of the present invention comprises a storage bin (10) with a plurality of compartments (11) and a plurality of labels (14) as shown in FIG. 1. The color coding system (1) further comprises a plurality of fastener parts (20), a plurality of tools (30) and a plurality of color coded markings, including first (50b), second (50c), third (50a) and fourth (50d) color code markings as shown in FIGS. 2, 3A-B and 5A-C.

In a preferred embodiment of the color coding system (1) in FIG. 1, each of the compartments (11) includes a front panel (13) having a display surface. The front panel (13) of the storage bin (10) includes a plurality of size indicating apertures (16).

Figure 2:
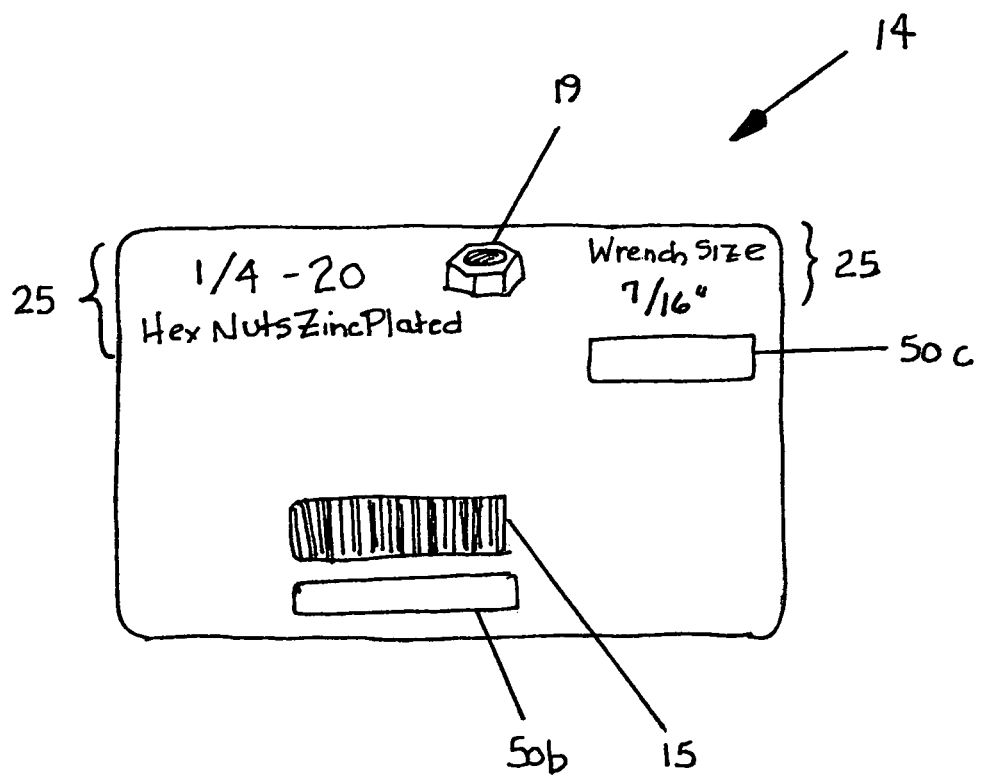
FIG. 2 is a front view of a label on one of the compartments of the storage bin comprised by the color coding system of FIG. 1.

Each label (14) as shown in FIG. 2 includes the description of a fastener part (20). Preferably, the description on each of the labels (14) includes a written description (25) including the size of a fastener part, a bar code (35) for the fastener part (20) and a picture (19) of the fastener part (20) described. A first (50c) and second (50d) color code markings are disposed on each of the labels (14). Each of the first (50b) and second (50c) color code markings is a color that is unique to a specific size of fastener part (20) and tool (30).

Figure 3B:
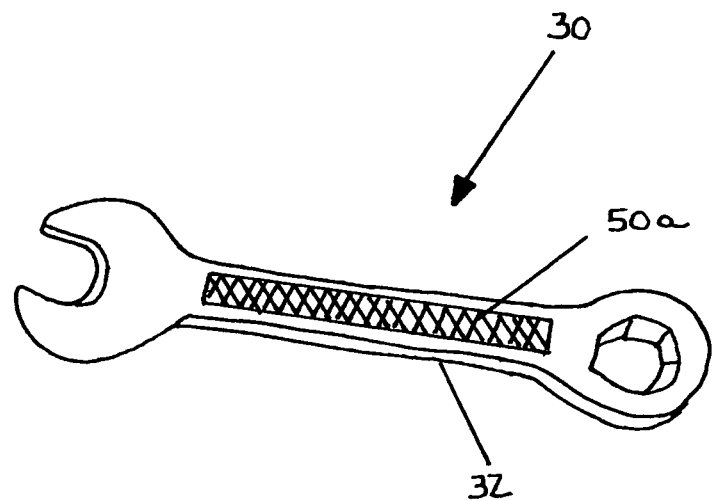
FIG. 3B is a perspective view of a tool comprising a wrench having a color code marking of the present invention.
Figure 3A:
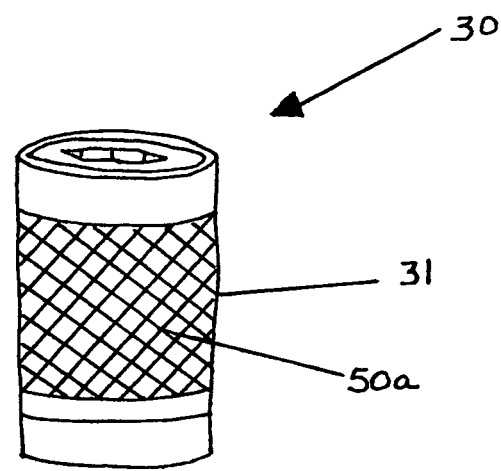
FIG. 3A is a perspective view of a tool comprising a socket having a color code marking of the present invention.

The tools (30) shown in FIGS. 3A and 3B include wrenches (32) and sockets (31). Each of the tools (30) has a third color code marking (50a) on an outer surface thereof.

Figure 5A:
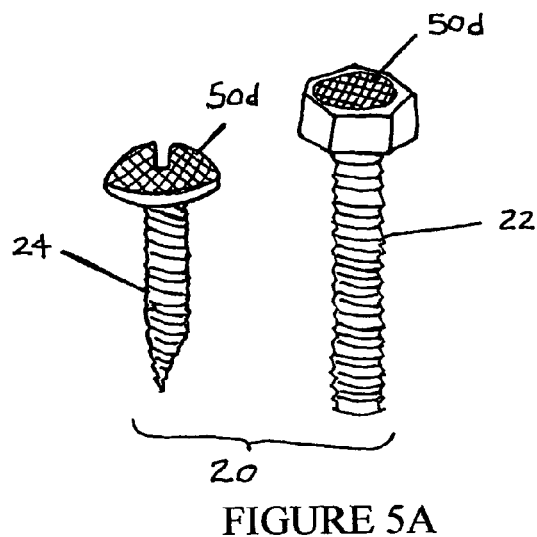
FIG. 5A is perspective view of an alternate embodiment of the color coding system of the present invention showing the color code marking disposed on fastener parts comprised by a bolt and screw.
Figure 5C:
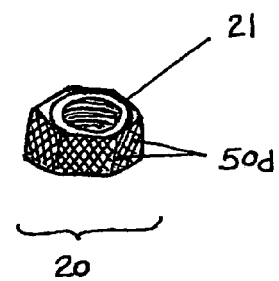
FIG. 5C is a perspective view of the alternate embodiment of the color coding system of FIG. 5A showing a fastener part comprised by a nut.
Figure 5B:
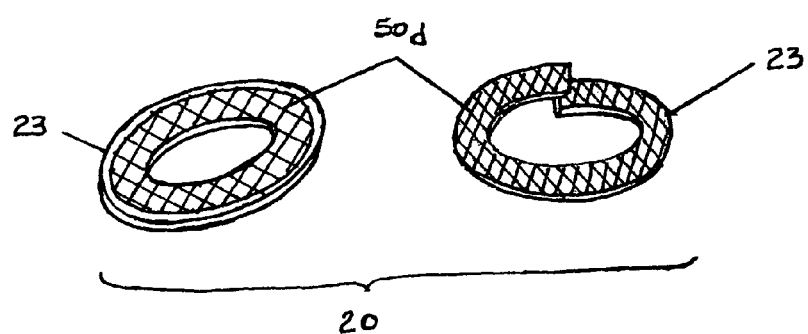
FIG. 5B is a perspective view of the alternate embodiment of the color coding system of FIG. 5A showing the color code marking disposed on fastener parts comprised by a flat washer and a locking washer.

The fastener parts (20) as shown in FIGS. 5A-5C comprise screws (24), nuts (21), bolts (22), and washers (23), including both flat washers and lock washers. It should be appreciated that the fastener parts (20) are not limited to those listed here, but would include all fastener parts having designated sizes, such as standard and metric sizes.

Figure 4:
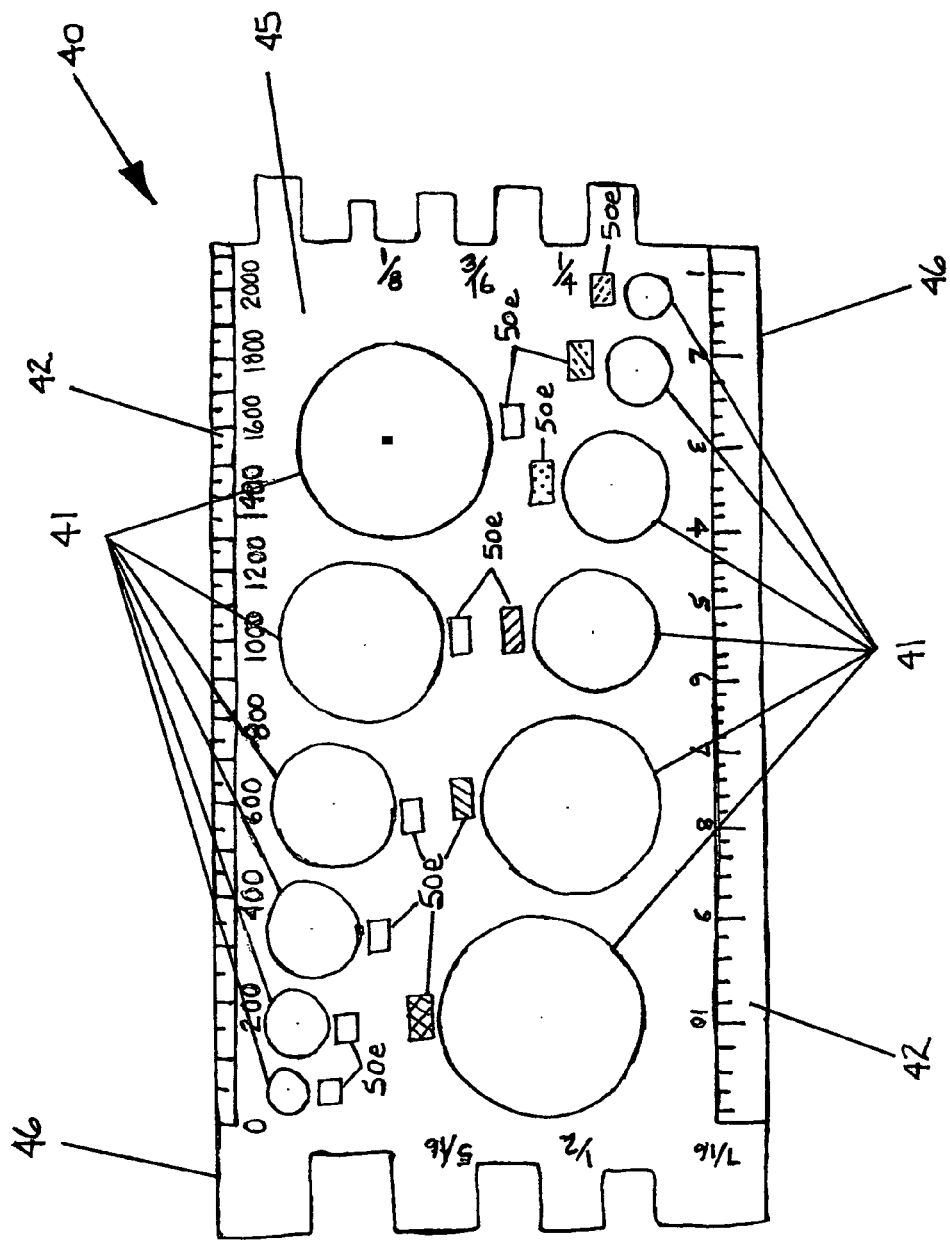
FIG. 4 is a perspective view of the bolt gauge of the present invention.

The color coding system further comprises a bolt gauge (40) shown in FIG. 4. The bolt gauge (40) includes a planar member (45) with edges (46), a plurality of size indicating openings (41), ruled markings (42) and gauge color code markings (50e). The ruled markings (42) on the bolt gauge (40) and on the ruler (17) of the storage bin (10) comprise standard and/or metric measurement units.

It should be noted that the shape of the color code markings (50a, 50b, 50c, 50d, 50e) is not limited by those shapes shown herein. The shape can vary according to the size and shape of the tools (30) and labels (14) on which the markings (50) are disposed. It is desirable that each of the color code markings (50a, 50b, 50c, 50d, 50e) be highly visible in order to render itself readily distinguishable in all types of lighting conditions.

On the bolt gauge (40) of FIG. 4, the size indicating openings (41) comprise varying sizes of diameters that coincide with standard and metric sizes for fastener parts (20).

The storage bin (10) houses the compartments (11) which hold the fastener parts (20). Each compartment (11) has a label (14) that is unique to the fastener part (20) held therein as shown by example in FIGS. 2 and 6B. The label (14) on each of the compartments (11) identifies the particular fastener part (20) designated for storage in the respective compartment (11). The written description (25), the bar code (15), and the picture (19) of the fastener part (20) identify the particular fastener part (20) stored in the respective compartment (11). The size indicating apertures (16) on the storage bin (10) also assist in identifying the size of fastener parts (20), particularly bolts (22), held in the compartments (11). Each of the plurality of compartments (11) as marked by a respective label assists the user in maintaining the fastener parts (20) sorted according to size and shape in the storage bin (10).

The label (14) and the color code markings (50b, 50c) indicate the size and type of fastener part (20) that is held in the compartment (11) and also indicates the particular sized tool (30) to fit that fastener part (20) described thereon. On the label (14), the first color code marking (50b) indicates the size of the cooperating fastener parts (20) and the second color code marking (50c) indicates the size of the cooperating tool (30) for that fastener part (20). The color code markings (50) and sizes for the fastener parts (20) and tools (30) as indicated on the label (14) may be the same or may differ in some instances.

The ruler (17) is a measurement device for sizing fastener parts (20). On the storage bin (10), shown in FIG. 1, the ruler (17) is used to determine the length of a bolt (22) or screw (24).

On the bolt gauge (40) shown in FIG. 4, the sizing apertures (41) are used to determine diameter of fastener parts (20). The ruled markings (42) are to determine the length of the fastener part (20), particularly the shaft of a bolt (22) or screw (24). Each color comprised by the gauge color code markings (50e) on the bolt gauge (40) are associated with a designated size and are used to locate and identify tools (30) and other fastener parts (20) of the same size.

Each of the first (50b), second (50c), third (50a) and fourth (50d) color code markings comprises a color. A unique color is designated for each of the different sizes of tools (30) and fastener parts (20) included in the color coding system (1). The first (50b) and second (50c) color code markings are disposed on the labels (14) of each compartment (11). The third color code markings (50a) are disposed on the tools (30) of the respective designated sizes. The fourth color code markings (50d) are disposed on the fastener parts (20) in an alternative embodiment of the present invention. The colors are the same for all the color code markings (50) that designate a single size. For example all of the color code markings (50) for a ½-inch fastener and a ½ inch wrench would be the same color.

The label (14) on each of the compartments (11) designates the size of the fastener parts (20) held in the respective compartments (11). Consequently, the fastener parts (20) of a particular size in the respectively labeled compartment (11) can be matched with other fastener parts (20) of the same size by matching the colors of the first color code markings (50b) on the labels (14) of the cooperating fastener's compartments (11).

Using the second color code marking (50c) on the compartment's labels (14), an associated fastener part (20) can be matched with the correspondingly sized tools (30). The second color code markings (50c) on the labels (14) of the compartments (11) and the third color code markings (50a) on the tools (30) are coordinated. Therefore, by matching the second color code marking (50c) on a label (14) with the third color code marking (50a) on the tool (30), the fastener parts (20) in that particular compartment (11) and the tool (30) are the same size and fit with each other.

The same method applies to matching the first color code markings (50b) on different compartments (11). The fastener parts (20) designated by each of the compartment labels (14) as having the same color for the first color code marking (50b) will fit with each other.

Figure 6A:
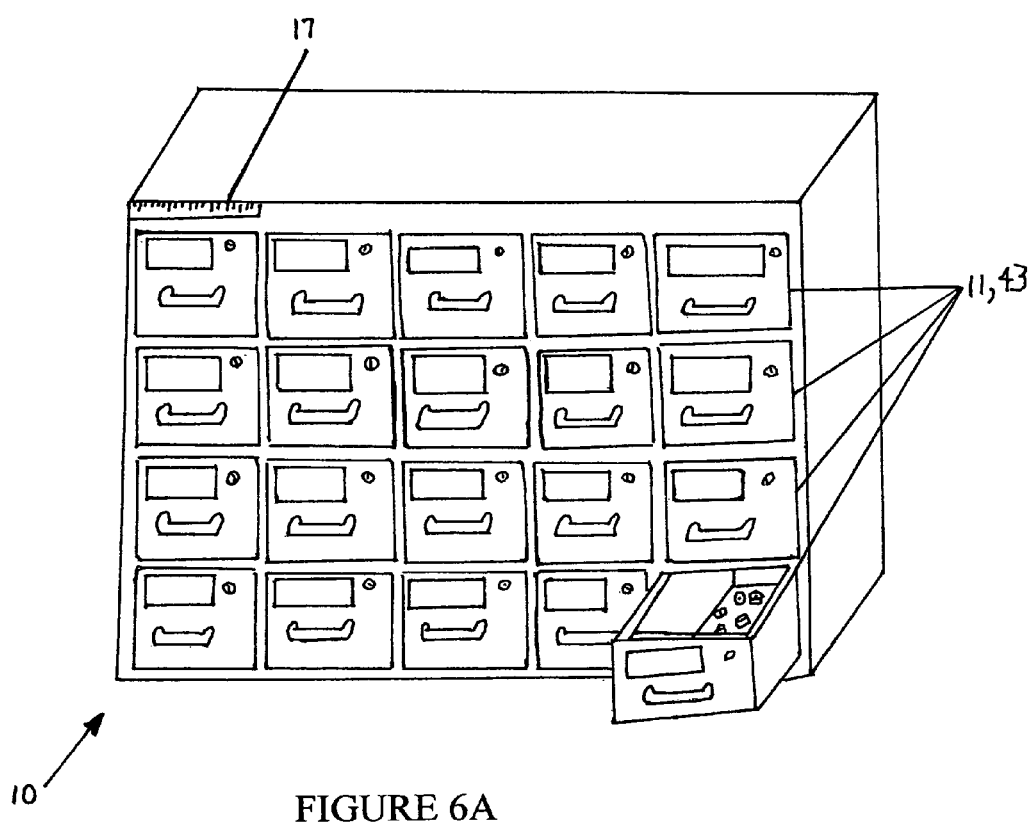
FIG. 6A is a perspective view of an alternate embodiment of the color coding system of the present invention having a storage bin with drawers.

Preferably, the ruler (17) is positioned on the front of the storage bin (10) as shown in FIGS. 1 and 6A. The labels (14) are disposed on the front panels (13) of the compartments (11) and indicate the contents of the respective compartments (11). The size indicating apertures (16) are also on the front panels (13) of the compartments (11).

For each size of fastener part (20), there is a size indicating aperture (16) of a matching size disposed on the compartment (11) of the storage bin (10). The size indicating aperture (16) designates the appropriate compartment (11) for holding the fastener parts (20) that fit the respective size indicating aperture (16).

Each of the size indicating apertures (16) has a diameter that fits the size of the fastener part (20) that is indicated on the respective label (14) and stored in that particular compartment (11). For example, a size indicating aperture (16) having a ¼-inch sized diameter fits bolts (22) having a ¼-inch sized shaft diameter. In turn, the bolts (22) having a ¼-inch sized diameter are stored in the compartment (11) having the size indicating aperture (16) with a ¼-inch sized diameter.

The first color code marking (50b) on the compartment's label (14) for the ¼-inch sized bolt and the first color code marking (50b) on the compartment's label (14) for the ¼-inch sized nuts (21) that fit said bolt also match each other in color. In addition, the second color code marking (50c) on the label (14) for the ¼-inch bolt matches the third color code marking (50a) on the tool (30) sized to fit the bolt.

The color of each color code marking (50) is unique to the group of fastener parts (20) and tools (30) having the same size. Each of the different sizes is designated by a unique color. For example, a ¼-inch size group can be assigned the color blue. The color code markings (50b,50c) for all of the ¼-inch sized fastener parts (20) and tools (30) are blue. Specifically, the first (50b) and second (50c) color code markings (50a,50b,50c) are blue on the label (14). The tools (30) that fit the ¼-inch sized fastener parts (20) comprise a third color code marking (50a) that is the same color blue. The blue color can be matched between the labels and fastener parts and tools to find the sizes that fit together.

As a further example of the unique color designations for sizes, the color for a 5/16-inch size can be designated as the color red, a 3/8-inch size can be designated as the color yellow, a 7/16-inch size can be designated as the color green, a ½-inch size can be black, a 9/16-inch can be orange and a 5/8-inch can be purple. Each of the color code markings (50a,50b,50c) comprises a color designated for a particular size. Each color code marking (50a,50b,50c) is placed on the respective labels (14) of the compartments (11) and tools (30) that coincide with the designated size. In this example, the labels (14) for ¼-inch size fastener parts (20) and all of the ¼-inch sized tools (30) would have a blue color code marking (50); the labels (14) for the 5/16-inch sized fastener parts (20) and all of the 5/16-inch sized tools (30) would have a red color code marking (50); and so on through the sizes and designated colors.

It can be appreciated that the colors designated herein for the color code marking (50) are merely suggestions. Colors can also be designated for metric sizes and changed to correspond with particular sizes according to the user's requirements. Different patterns can be used instead of or can be used in addition to colors for the color code markings.

Furthermore, the wrenches (32) and sockets (31) of the tools (30) are given color code markings (50a) that match the designated color on the label (14) coinciding with the compartment (11) for holding the respectively sized fastener parts (20). The labels (14) on the storage bins (10) are also given color code markings (50b,50c) to coincide with cooperating tools (30) and the other cooperating fastener parts (20). Therefore, all of the tools (30) having the same size and the compartment (11) designated by the label (14) for storing fastener parts (20) of that same size have the same color comprising their color code marking (50a,50b,50c).

It should be noted that the color code markings (50a,50b, 50c) and the sizes for the fastener parts (20) and tools (30) as indicated on the label (14) may all be the same color and size. However, in some instances for a selected fastener part (20), the size of the cooperating tool (30) does not coincide with the size of the cooperating fastener parts (20) noted on the label (14). When this occurs, the second color code marking (50c) on the label (14) indicating the properly sized tool (30) is different from the first color code marking (50b) on the label (14) indicating the properly sized fastener parts (20). Despite the tools and cooperating fastener parts being different sizes and having different colors for the color code markings (50), the color code markings (50b,50c) on the label (14) will still indicate the proper fitting tool (30) and proper fitting fastener parts (20) for the selected fastener part (20).

The bolt gauge (40) in FIG. 4 includes a plurality of sized apertures (41) therethrough. Each of the apertures (41) comprises a specifically designated size. Each designated size is associated with a unique color corresponding to a gauge color code marking (50e) on the bolt gauge (40). Each of the colors of the gauge color code markings (50e) on the bolt gauge (40) matches the unique color designated for each of the respective sizes of fastener parts (20) and labels (14) on the storage bin (10).

In the color coding system (1) of the present invention, a unique color is selected for each size of the fastener parts (20) and tools (30). The third color code marking (50a) is disposed on an outer surface of the correspondingly sized tool (30). Two color code markings (50b,50c) are disposed on each label (14) on the storage bin (10). The first color code marking (50b) on the label (14) matches the correspondingly sized fastener parts (20). The second color code marking (50c) on the label (14) matches the third color code marking (50a) of the correspondingly sized tool (30). The first (50b) and second (50c) color code markings (50b,50c) on the label (14) may be the same color or may differ in some instances, as previously mentioned.

In an alternative embodiment in which a fourth color code marking (50d) appears on the fastener parts (20), the fourth color code marking (50d) and the first color code marking (50b) are the same color for the same size of fastener parts (20).

Each compartment (11) has the first (50b) and second (50c) color code markings displayed on its respective label (14) so that each color code marking (50b,50c) coincides with the respective sizes of fastener parts (20) and tools (30). The fastener parts (20) are placed in the proper compartments (11) for storage.

To use the color coding system of the present invention, a mechanic assembling a fastener might, for example, have an unsized bolt (22) and needs to find a nut (21) and washer (23) to fit the bolt (22). He or she takes the bolt (22) to the storage bin (10) and searches the size indicating apertures (16) on the compartments (11) until finding the proper fit for the bolt (22). The proper size indicating aperture (16) is disposed on the compartment (11) holding the correspondingly sized nut (21). He or she can then retrieve the proper sized nut (21) from the compartment (11).

To find additional cooperating fastener parts (20) for the bolt (22), the mechanic consults the label (14) on either the compartment (11) holding the bolt (22) or the compartment (11) holding the proper sized nut (21) in order to find the first color code marking (50b). Next, the color of this first color code marking (50b) is matched with a first color code marking (50b) on another compartment (11) holding the desired fastener parts (20). The fastener parts (20) of the compartments having matching first color code marking (50b) are the same size. He or she can then retrieve the proper sized part (20) from that compartment (11).

To find a properly sized tool (30) for use with a selected fastener, the user consults the label (14) on the compartment (11) holding the selected fastener part (20). The second color code marking (50c) on that label (14) designates the size of the cooperating tool (30) to fit the fastener part (20). He or she then matches the color of the first color code marking (50b) from the fastener part's label (14) with the third color code marking (50a) on the tool (30) thereby identifying the correctly sized tool to use for the part (20).

Conversely, a mechanic can match a particular size of wrench (32) or other tool (30) to a fastener part (20) simply by matching the third color code marking (50a) on the wrench (32) with second color code marking (50c) on the label (14) of the compartment (11) containing the desired type of fastener part (20).

Also, according to another preferred embodiment of the present invention, there is a color coded standard bolt gauge (40) that can be used to identify sizes of fastener parts (20) and tools (30). The bolt gauge (40) is especially useful in the field when access to a storage bin cabinet (10) is not readily available or limited. As shown in FIG. 4, each of the size indicating openings (41) in the bolt gauge (40) has a gauge color code marking (50e) to match the color code marking (50a) on the tools (30) having a corresponding size. By finding the size of the fastener part (20) using the size indicating openings (41), the user has identified the color of the color code markings (50) for that particular size. Then by matching the color code marking (50e) from the bolt gauge (41) to the color code marking (50a) on the tool (30), the user can identify the proper fitting tool (30) for the selected fastener part (20).

The color coding system of the present invention can reduce the time-consuming process of matching correspondingly sized fastener parts and tools by trial and error.

Using the color coding system of the present invention, a user can readily locate related fastener parts (20) by matching the colors on the compartment labels (14) for such items. Similarly, the user can match the color on the label (14) of a fastener part's compartment (11) to match the color on a tool (30) to locate the proper tool to use with the fastener part (20).

This enables the user to readily locate the properly sized fastener parts and tools in addition to keeping them properly sorted according to size. By keeping the fastener parts properly sorted and by being able to quickly locate matching fastener parts and tools, time and frustration can be reduced when performing a task. Such advantages can result in lower costs for individual users and businesses.

In addition, the color coding system of the present invention can be retroactively fitted to an existing storage bin. The labels can be disposed on the storage bin to identify the compartments for holding respectively sized fastener parts and the color code markings (50a) can be placed on the tools (30) according to size.

In an alternative embodiment of the present invention as previously mentioned, the fastener parts (20) comprise a fourth color code marking (50d) disposed on an outer surface thereof as shown in FIGS. 5A-C. The fourth color code markings (50d) on the fastener parts (20) coincide with the colors designated for the sizes indicated by the first (50b), second (50c) and third (50a) color code markings on the compartment labels (14) and tools (30). Consequently, the sizes of fastener parts (20) can be readily matched with other fastener parts (20) and tools (30) independently of the storage bin (10) and sizing gauge (40). In the event that a particular fastener part (20) requires a corresponding tool (30) of a different size than its corresponding fastener parts (20), two color code markings (50) are preferably disposed on such particular fastener part (20) in a fashion to indicate the correct size of corresponding fastener parts (20) and the correct size of corresponding tools (30). This indication may be given by placing fourth color code markings (50d) on the fastener parts (20). The fourth color code markings (50d) can be color or patterns or a combination of the two.

Figure 6B:
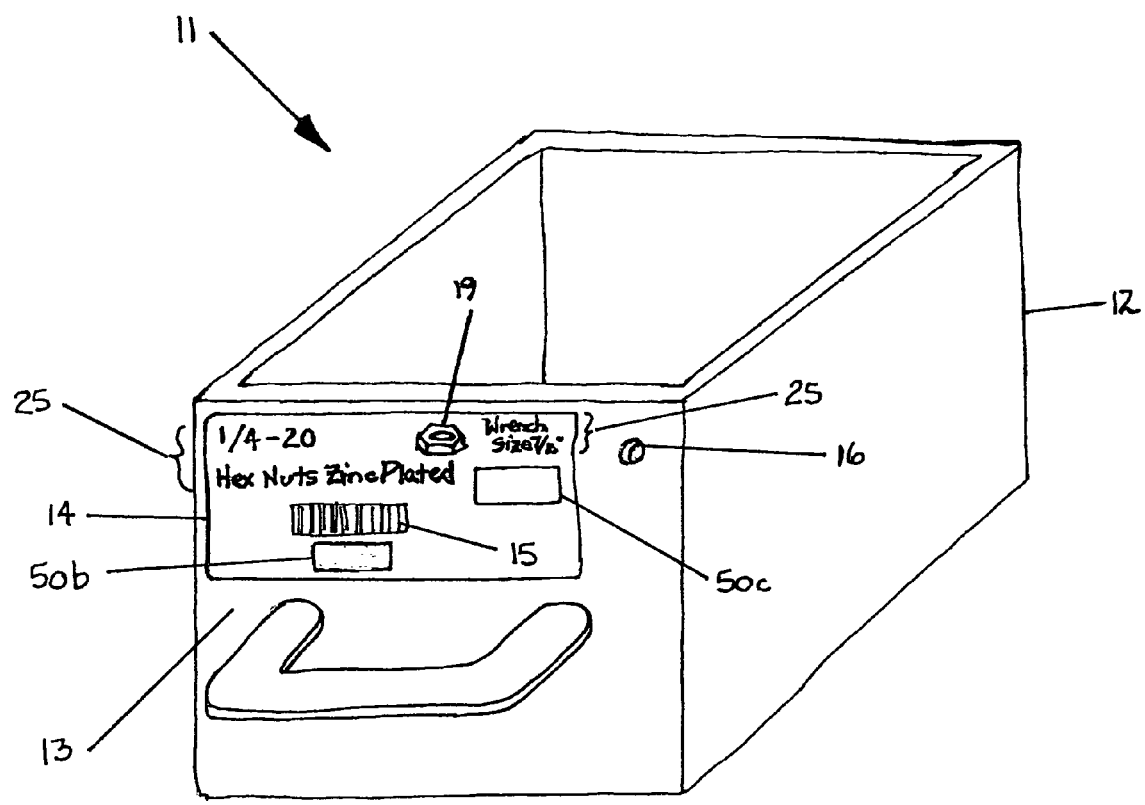
FIG. 6B is a perspective view of a drawer from the color coding system shown in FIG. 6A.

In another embodiment of the present invention, each of the compartments (11) comprised by the storage bin (10) include drawers (43) for holding the fastener parts (20) as shown in FIGS. 6A-B.

Figure 7:
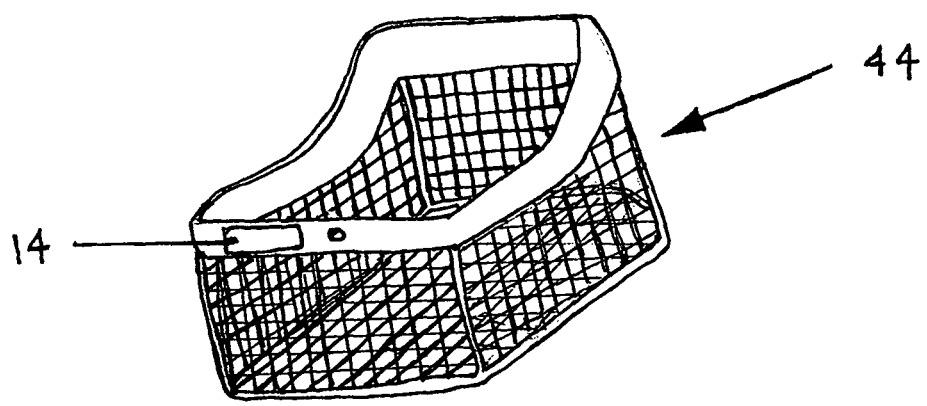
FIG. 7 is a perspective view of a basket for use in the storage bin of an alternate embodiment of the color coding system of the present invention.

In another embodiment, each of the compartments comprise a basket (44) as shown in FIG. 7 for holding the fastener parts (20) in a storage bin (10).

Although the present invention has been described in considerable detail with reference to certain preferred versions thereof, other versions are possible. Therefore, the spirit and scope of the appended claims should not be limited to the description of the preferred versions contained herein.

The invention claimed is:

1. A color coding system for a storage bin to size fastener parts and cooperating tools, the color coding system comprising:
 a storage bin;
 a plurality of fastener parts, wherein said fastener parts having different sizes;
 a plurality of tools, wherein said tools having different sizes, wherein at least one of said tools fits at least one of said fastener parts;
 a plurality of labels;
 a plurality of first color code markings, wherein each of said first color code markings designates a specific size of a respective fastener part, and each of said first color code markings is disposed on a respective one of said plurality of labels;
 a plurality of second color code markings, wherein each of said second color code markings designates a specific size of a respective tool, and each of said second color code markings is disposed on a respective one of said plurality of labels; wherein the fastener part designated by the first color code marking on one of said plurality of labels is sized to cooperate with the tool designated by the second color code marking that is disposed on the same label;

a plurality of third color code markings, wherein each of said third color code markings is disposed on a respective tool and each of said third color code markings designates a specific size comprised by the respective tool;

wherein the first, second and third color code markings comprise a unique color for each one of the designated sizes;

wherein said labels are disposed on the storage bin, such that each compartment has a respective label thereon; and wherein said first and second color code markings on a respective label indicate cooperating sizes of the designated fastener part and the designated tool.

2. The color coding system of claim 1, wherein one of said plurality of labels for each of the different sizes of fasteners is disposed on a respective one of said compartments comprising the storage bin and said label indicates the size of the fastener part designated for storage in said compartment.

3. The color coding system of claim 2, further comprising a plurality of size indicating apertures, wherein one of said size indicating apertures is disposed on a front panel of each of said compartments and each of said size indicating apertures has a diameter comprising a size that coincides with one of the different sizes of the fastener parts designated on the label disposed on the respective compartment.

4. The color coding system of claim 2, comprising a fourth color code marking disposed on said fastener parts, wherein said fourth color code marking on each one of the fastener parts comprises a color that matches the first color code marking disposed on the label of a compartment designated for holding cooperating fastener parts.

5. The color coding system of claim 4, wherein any of said fastener parts having a fourth color code marking that matches a color of said third color code marking on at least one of said tools is sized to fit with said one tool designated by said third color code marking.

6. The color coding system of claim 5, wherein any of said fastener parts having a fourth color code marking that matches a color of the fourth color marking on another fastener part is sized to fit with said another fastener part.

7. The color coding system of claim 2, wherein when said third color code marking on a tool comprises a color that matches the color of said second color code marking on the label of a compartment designated to hold at least one fastener part, said designated fastener part is sized to fit said respective tool.

8. The color coding system of claim 1, wherein said plurality of labels further comprises a written description of one of said fastener parts, a picture of said one fastener part and a bar code for said one fastener part.

9. A color coding system for a storage bin, fastener parts, and cooperating tools comprising:

a storage bin;

a plurality of fastener parts, said fastener parts comprising a plurality of different sizes;

a plurality of tools, said tools comprising a plurality of different sizes, wherein at least one of said tools fits at least one of said fastener parts;

a plurality of labels, wherein each of said labels includes a written description of one of said fastener parts, a picture of said one fastener part and a bar code for said one fastener part;

a plurality of first color code markings disposed on said labels to indicate size of said fastener parts;

a plurality of second color code markings disposed on said labels to indicate size of said tools;

a plurality of third color code markings disposed on said plurality of tools; and wherein said storage bin includes a plurality of compartments and a ruler;

wherein each of said compartments comprises a front panel with a display surface, and a fastener size indicating aperture;

wherein said plurality of labels are mounted on said storage bin, such that one label is disposed on the front panel of each of said compartments;

wherein at least one of said different sizes of said fastener parts coincides with at least one of said different sizes of said plurality of tools;

wherein one of said size indicating apertures is disposed on each of said front panels and has a diameter of a size that coincides with at least one of the different sizes of the fastener parts;

one of said tools having a third color code marking that comprises a color matching the second color code marking on the label of one of the compartments is sized to fit said fastener part designated to be stored in said one compartment.

10. The color coding system of claim 9, further comprising a plurality of fourth color code markings disposed on said plurality of fastener parts; wherein each of said fourth color code markings is disposed on one of said fastener parts and indicates a size of the fastener part; and wherein said fastener parts having a fourth color code marking that matches a color of another of said fourth color markings on another fastener part is sized to fit with said another fastener part.

* * * * *